United States Patent [19]
Johnson et al.

[11] Patent Number: 5,822,300
[45] Date of Patent: Oct. 13, 1998

[54] CONGESTION MANAGEMENT SCHEME

[75] Inventors: Brian W. Johnson, Lucas; Hieu M. Hoang, Flower Mound, both of Tex.

[73] Assignee: Compaq Computer Corporation, Houston, Tex.

[21] Appl. No.: 627,692

[22] Filed: Apr. 2, 1996

[51] Int. Cl.$^6$ .................................................. H04J 3/14
[52] U.S. Cl. .................. 370/229; 370/236; 370/402; 370/412; 370/423; 395/877; 395/200.62
[58] Field of Search .................................. 370/229, 230, 370/231, 235, 236, 239, 240, 252, 400, 401, 402, 403, 404, 405, 410, 412, 413, 414, 415, 416, 417, 418, 428, 474, 476, 422, 423, 424, 425, 420, 421, 426, 407; 395/200.13, 877, 879, 849, 200.05, 200.02, 250

[56] References Cited

U.S. PATENT DOCUMENTS

| | | |
|---|---|---|
| 5,014,265 | 5/1991 | Hahne et al. . |
| 5,090,011 | 2/1992 | Fukuta et al. ............................ 370/230 |
| 5,163,046 | 11/1992 | Hahne et al. . |
| 5,179,556 | 1/1993 | Turner ...................................... 370/233 |
| 5,287,535 | 2/1994 | Sakagawa et al. . |
| 5,315,587 | 5/1994 | Kullander . |
| 5,359,649 | 10/1994 | Rosu et al. . |
| 5,361,372 | 11/1994 | Rege et al. .............................. 370/229 |
| 5,367,523 | 11/1994 | Chang et al. . |
| 5,371,731 | 12/1994 | Pratt et al. .............................. 370/216 |
| 5,408,469 | 4/1995 | Opher et al. ............................ 370/401 |
| 5,412,648 | 5/1995 | Fan .......................................... 370/414 |
| 5,416,769 | 5/1995 | Karol ...................................... 370/414 |
| 5,438,567 | 8/1995 | Ikeda ...................................... 370/417 |
| 5,440,553 | 8/1995 | Widjaja et al. ......................... 370/411 |
| 5,444,706 | 8/1995 | Osaki ..................................... 370/230 |
| 5,448,558 | 9/1995 | Gildea et al. .......................... 370/412 |
| 5,475,682 | 12/1995 | Choudhury et al. ................... 370/229 |
| 5,493,566 | 2/1996 | Ljungberg et al. .................... 370/231 |
| 5,541,987 | 7/1996 | Topper et al. . |

OTHER PUBLICATIONS

Article: Larson, David; "Designing a Software–Based Ethernet Switch"; *Communication System Design*; Apr. 1996, pp. 32–34, 38, 40.

*Primary Examiner*—Wellington Chin
*Assistant Examiner*—Huy D. Vu
*Attorney, Agent, or Firm*—Jenkens & Gilchrist

[57] ABSTRACT

A congestion management scheme for managing traffic in a data communication system having a plurality of port blocks at least one of which may be connected to a communication medium, the congestion management scheme including a structure for determining whether a sender is congested, a structure for determining whether a receiver is congested, and a structure for determining whether a RX FIFO is congested and a structure for determining a memory buffer, associated with at least one of the sender and the receiver, is congested. The congestion scheme further includes a structure for handling traffic by taking one of the preferred actions depending upon the congestion indicators.

22 Claims, 9 Drawing Sheets

CONGESTION MANAGEMENT SCHEME

BACKGROUND OF THE INVENTION

1. Field of the Invention

The present invention relates generally to flow control through switching apparatus. More particularly, the present invention relates to schemes for facilitating flow, in the event of component congestion.

2. Description of the Related Art

Switching systems, that is, systems that establish communication channels among two or more interfaces at a customer's demand, are well known in the art. In general, in the operation of such systems, message data from a "sender" is received at a switch port (an "incoming port") and transferred to one or more other switch ports ("outgoing ports"), as appropriate, connected to an intended "receiver" or intended "receivers" of the message data.

Excess traffic (i.e., congestion), at any point in a switch can be disruptive. If, for example, an outgoing port simultaneously received message data from a multitude of other incoming ports, the capability of that outgoing port to handle the traffic appropriately could fail. Such failure could lead to lost messages.

Based on the foregoing, it should be appreciated that switching systems need well designed mechanisms to ameliorate congestion or possible problems from congestion. It is desirable that messages not be lost. If, however, one or more of multiple messages must be lost, it is desirable that the relatively unimportant ones be lost. Further, it may be desirable to "hold" messages in systems for a time to avoid congestion. If so, where and for how long messages are held can affect system performance.

Various congestion management systems have been heretofore been developed in view of the above-mentioned considerations. For example, the U.S. Pat. No. 5,371,731, to Pratt et al., which relates to traffic management in a relay-based communications network such as Frame Mode Bearer Service ("FMBS"), describes a network traffic management system and method wherein a Recovery Needed Flag ("RNF") is set at a node, thereby causing the frame to be dropped, upon detection of incorrect transmission of a frame or congestion at the node. With the RNF set, all frames transmitted subsequent to the discarded frame are also discarded by the node, until a frame with the Recovery Flag set is received.

In another example, the U.S. Pat. No. 5,090,011, to Fukuta et al., which relates to packet congestion control in a packet switch, describes a method wherein when the number of packets in a buffer associated with an output line exceeds a threshold value, congestion information is added to an out-going packet so as to serve as a congestion notice.

Although such various prior art congestion management systems have heretofore been extant for sometime, no such system is known to have all of the advantages and novel features of the system described, and claimed, hereinbelow.

SUMMARY OF THE INVENTION

In one aspect of a presently preferred exemplary embodiment, the present invention includes a system for managing congestion within a data communication system of the type having a sender and a receiver between which traffic may be transmitted, wherein the system for managing congestion comprises a structure for determining whether the sender is congested; a structure for determining whether the receiver is congested; and a structure for handling said traffic as follows: (i) if the sender is congested and the receiver is not congested, then transmitting the traffic; (ii) if the sender is not congested and the receiver is not congested, then transmitting the traffic; (iii) if the sender is not congested and the receiver is congested, then holding the traffic; and (iv) if the sender is congested and if the receiver is congested, then dropping the traffic.

In another aspect, the present invention also includes a data buffer associated with each of the sender and the receiver, wherein the congestion management system further comprises a structure for determining whether the data buffer associated with the sender is congested and a structure for determining whether the data buffer associated with the receiver is congested.

In a further aspect of a presently preferred embodiment, the present invention includes a method for managing congestion within a data communication system of the type having a sender and a receiver between which traffic may be transmitted, the method for managing congestion comprising the steps of: determining whether the sender is congested; determining whether the receiver is congested; and handling the traffic as follows: (i) if the sender is congested and the receiver is not congested, then transmitting the traffic; (ii) if the sender is not congested and the receiver is not congested, then transmitting the traffic; (iii) if the sender is not congested and the receiver is congested, then holding the traffic; and (iv) if the sender is congested and if the receiver is congested, then dropping the traffic.

In a still further aspect of the present invention, the congestion management system includes a sender-congestion-indicator, a receiver-congestion-indicator; a FIFO-congested-indicator; a scheme for determining whether the traffic is high priority or low priority; and a two-tiered time-out mechanism for determining how long the traffic should be held in a temporary storage medium if there is congestion.

In an embodiment of the present invention, the sender and the receiver of the data communication system are operably associated with a communication medium such as an Ethernet medium, or a fiber distributed data interface medium, or an asynchronous transfer mode medium.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

Figure 1:
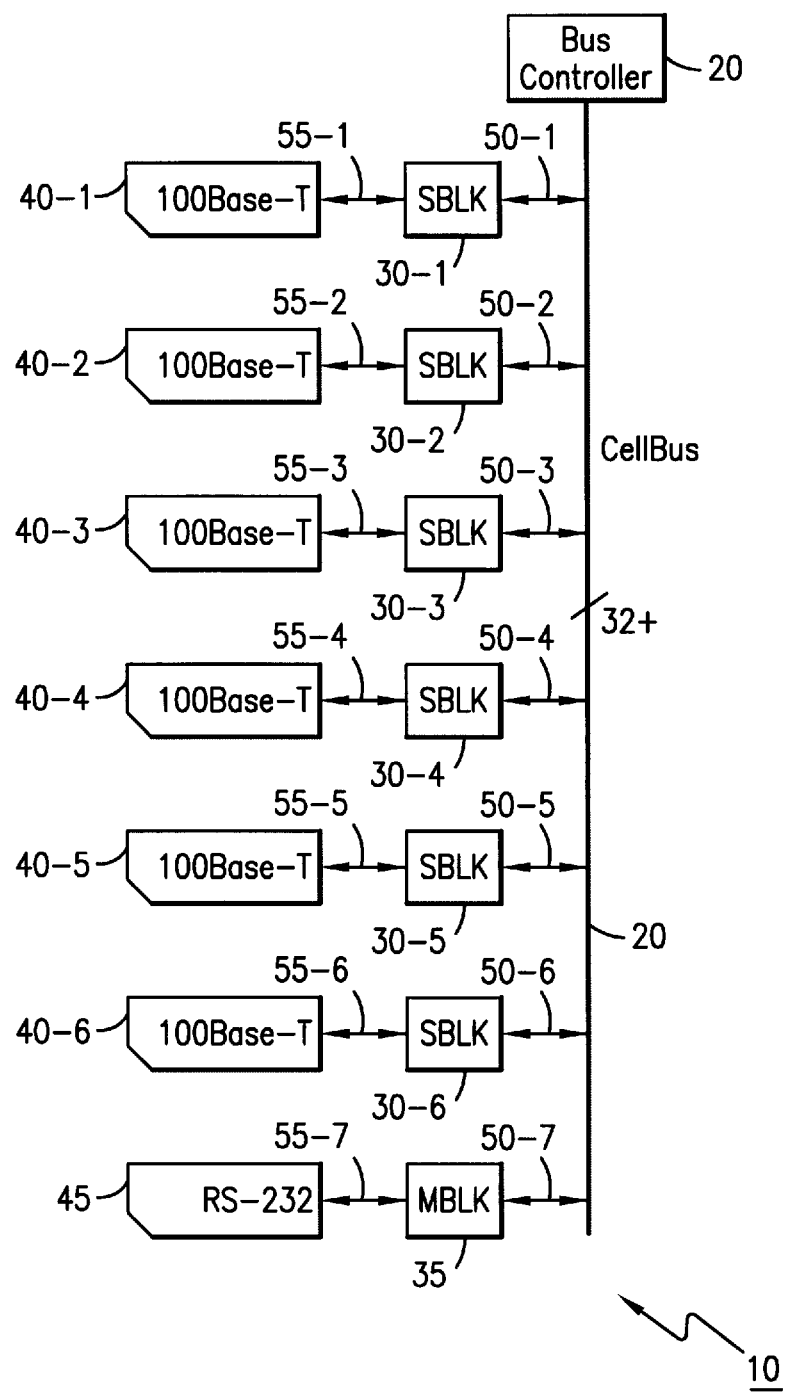
FIG. 1 is a block diagram of an exemplary communication switch having a plurality of port blocks, wherein the present invention relating to congestion management may be employed.

FIG. 1 depicts a block diagram of an embodiment of an exemplary communication switch, generally shown at 10, wherein the present invention may be utilized for congestion management. The communication switch 10 may be used in a data communication system such a 100 Mbit/sec Ethernet port system (hereinafter "100Base-T"). The communication switch 10 comprises a plurality of switching port blocks (hereinafter "SBLK"), 30-1 to 30-6, and a management block (hereinafter "MBLK") 35. The communication switch further includes a centralized bus controller 20 operably connected to a cell bus (hereinafter "CBus") 25 which in the exemplary communication switch can be 32-bit wide. Each of the SBLKs, 30-1 to 30-6, and the MBLK 35 of the communication switch can communicate with each other via CBus 25. Although, good results have been achieved using a 32 bit wide bus for CBus data transmission, it is contemplated to be within the scope of the present invention that different bus architectures could be utilized depending upon user requirements.

Continuing with FIG. 1, reference numerals 40-1 to 40-6 refer to a plurality of 100Base-T media each of which is connected to an SBLK via an external interface 55-1 to 50-6. Further, each SBLK interfaces with the CBus 25 via a pair of FIFOs (a receive FIFO, hereinafter "CBus RX FIFO" and a transmit FIFO, hereinafter "CBus TX FIFO") (shown hereinbelow in FIG. 2). The bus controller 20 performs the actual transfer of data between the FIFOs of the SBLKS.

In the general operation, data from the media arrives at an SBLK in the form of a packet. The receiving SBLK is also referred to as an input port block. There, the packet data is fragmented into "cells" and is either filtered (that is, used internally within the SBLK) or forwarded to other SBLKs depending upon a destination address. Complete cells are transferred across the CBus 25 to the other designated SBLKs uninterrupted, wherein they are reassembled into packets for downstream media transport.

Figure 2:
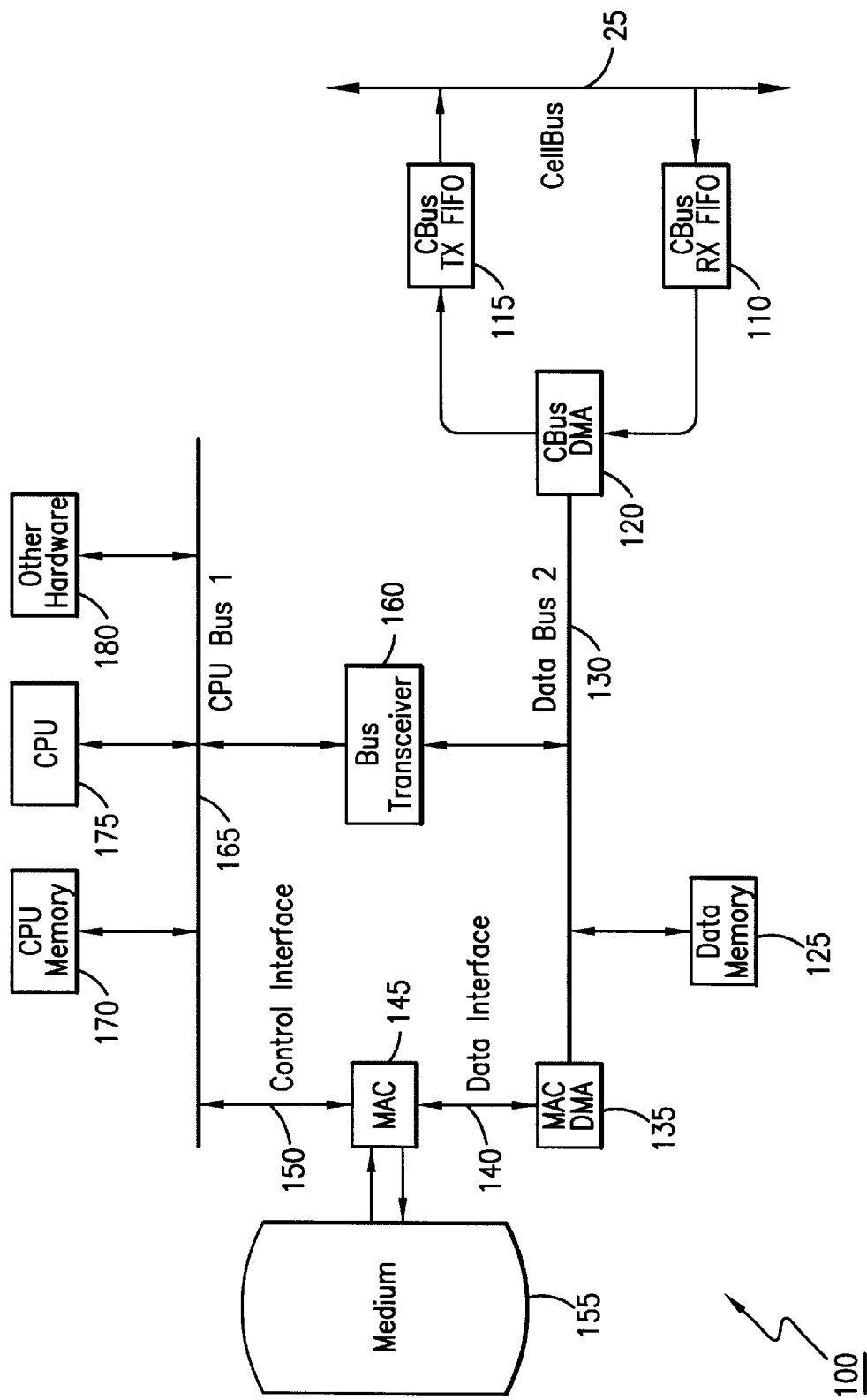
FIG. 2 is a structural block diagram of a switch port block, illustrating the physical architecture.

Referring now to FIG. 2, therein is depicted a block diagram, generally at 100, illustrating in more detail the physical architecture of each of the SBLKs, such as SBLK 30-1, shown in FIG. 1. SBLK 30-1 includes a CBus TX FIFO 115 and a CBus RX FIFO 110, each of which is connected to cell bus DMA ("CBus DMA") 120, and interface with the CBus 25. SBLK 30-1 further includes a processor such as CPU 175 and two internal buses, a CPU bus 165 and a data bus 130, each further having a block of preferably static memory, a CPU memory 170 and a data memory 125, respectively. It is further seen that there may be other hardware 180 also associated with the CPU bus 165.

The CPU bus 165 is used by the CPU 175 for executing the firmware needed for cell or cell-chain processing as will be explained further hereinbelow. The data bus 130 is for use principally by the DMA systems, MAC DMA 135 and CBus DMA 120 for moving the cells to and from the MAC device 145 and the CBus 25. The MAC device 145 which is connected to the 100Base-T medium 40-1, is further connected to both CPU bus 165 and data bus 130.

Although good results have been achieved utilizing two internal data buses, it is contemplated that the present invention can be practiced by one skilled in the art with a single internal bus or multiple internal buses.

Continuing with FIG. 2, the data memory 125 may preferably be implemented into two blocks of memory, each of which is used for implementing a data structure known as a ring which may be understood as a circular buffer that could be pointed to by one or several pointers. The ring structures will be further explained hereinbelow in reference to FIGS. 5, 6 and 7.

Figure 3:
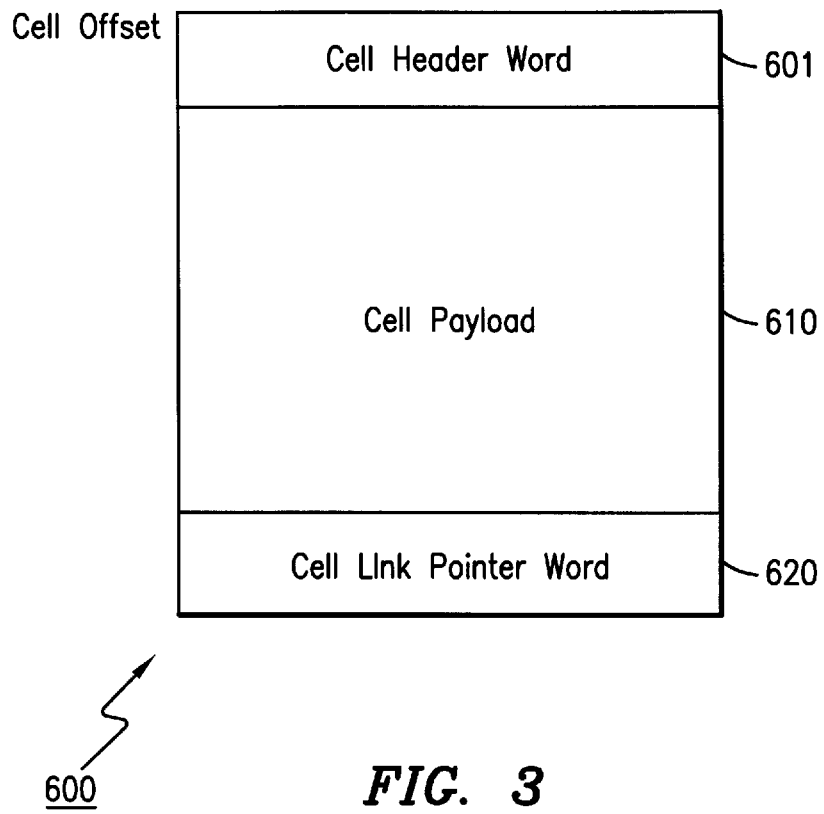
FIG. 3 illustrates a memory buffer map for a cell.

Referring now to FIG. 3, therein is shown a preferred structural configuration, generally at 600, of a cell buffer used for storing a cell, the basic unit of data transmission across CBus 25, that may contain either fragmented packet information or a management message. While stored in memory, cells are stored in cell buffers which may preferably be of fixed uniform length. The first word is the cell header word 601 which is used to identify the nature, source, destination, and payload length of the cell. The cell header word 601 is always transmitted across the CBus 25, provided the destination bitmap is nonzero, as will be explained hereinbelow in reference to FIGS. 4 and 5. The last 32 bit word is the cell link pointer word 620 which is used within each SBLK to reassemble the chains of possibly non-sequential cells to form a packet and to link chains together, as will be explained hereinbelow in reference to FIG. 5. The cell link pointer word 620 is used only within the SBLK, or the MBLK as the case may be, and is never transmitted over the CBus 25. The remainder of the cell buffer 600 is the cell payload 610. It may preferably be used to transport packet information in data cells or to transport administrative and management information in a management message cell.

Figure 4:
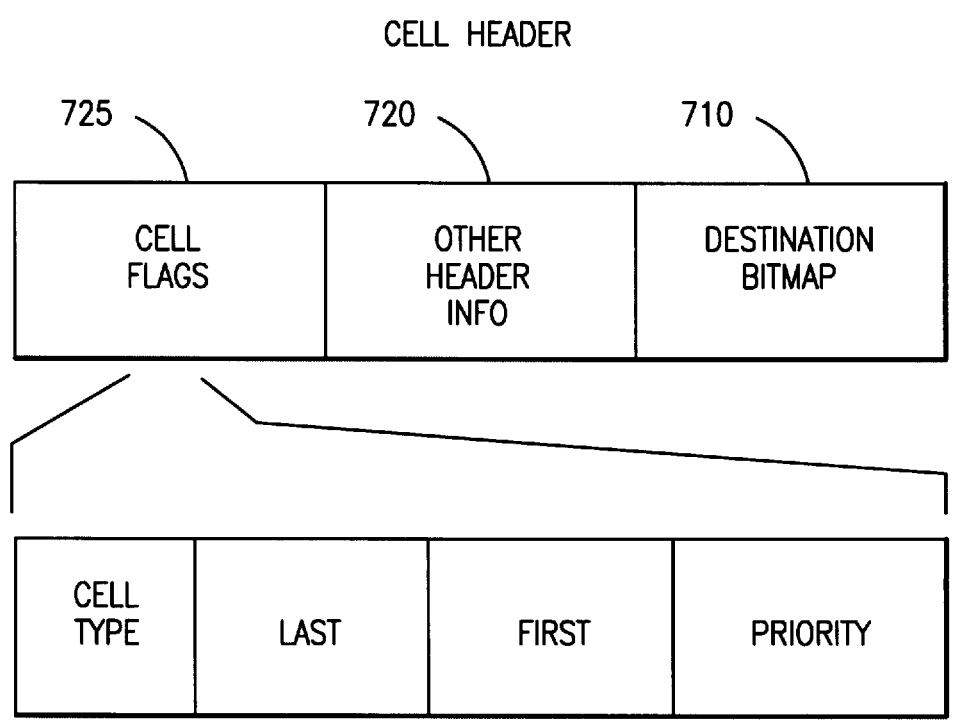
FIG. 4 illustrates the bit configuration of a cell header word in a cell.

Referring now to FIG. 4, therein is depicted a presently preferred exemplary embodiment of the cell header word 601, shown in FIG. 3. The header 601 contains three basic fields: a destination bitmap 710; a cell flag field 725, which is further described in greater detail hereinbelow; and a field 720 containing other header information.

Continuing with FIG. 4, the destination bitmap 710 is set by the firmware resident in CPU memory 170 (shown in FIG. 2) and used by the hardware associated with CBus TX DMA 120. When transmitted across the CBus 25, the cell is adapted to be delivered to those modules specified by the bitmap field 710. In one embodiment, any combination of destination bits can be set in the destination bitmap 710. Setting multiple bits specifies delivery via CBus 25 to multiple destination modules (that is, other SBLKs and the MBLK). In a presently preferred exemplary embodiment, up to thirteen modules, including the MBLK, can be addressed within the communication switch 10 (shown in FIG. 1).

Still continuing with FIG. 4, it is seen that the cell flag field 725 contains at least 4 bits. The PRIORITY flag, if set, specifies that the cell is a high priority cell. As will be described hereinbelow in reference to FIGS. 8, 9 and 10, such cells are less likely to be discarded according to the teachings of the present invention. The FIRST flag specifies that the cell is the first of a related group of cells pertaining to a single packet. For example, a maximum size Ethernet packet requires 13 cells in accordance with the present invention. Further, according to the present invention, the FIRST flag may be used to re-enable congested destination modules, as will be explained below. The LAST flag specifies that the cell is the last of a related group of cells pertaining to a single packet, and this may also be used to re-enable congested destination modules. The cell type flag specifies the cell category. If cleared (that is, 0) it denotes a packet data cell; and all administrative and management cells have this bit set.

Figure 5:
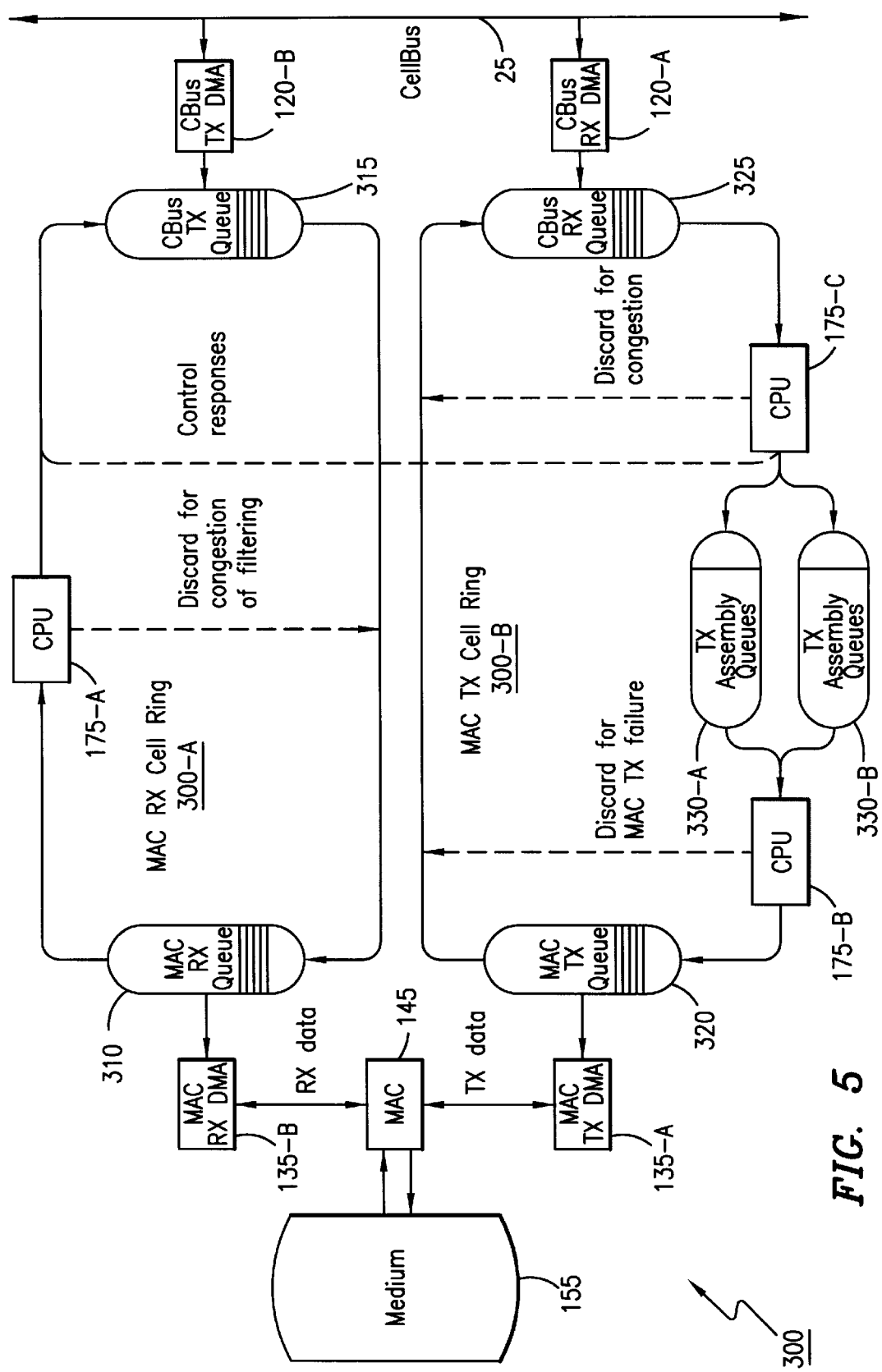
FIG. 5 is a functional block diagram of a switch port block depicting the logical cell flow therein.

Referring now to FIG. 5, functional block diagram 300 depicts the logical cell and data flow within an SBLK such as SBLK 30-1 as shown in FIGS. 1 and 2. Two logical rings are utilized and maintained: a receive ring (MAC RX cell ring) 300-A, and a transmit ring (MAC TX cell ring) 300-B. MAC RX cell ring 300-A is utilized for cells received from the MAC device 145 or created by CPU 175-A and forwarded to other modules (SBLKs and MBLK). MAC TX cell ring 300-B is used for cells received from other modules, intended for CPU 175-B and CPU 175-C, or for transmission through MAC 145. As will be readily appreciated by those skilled in the art, although CPU 175 (as shown in FIG. 2) is one structural entity, it is functionally and logically subdivided into CPU 175-A, CPU 175-B and CPU 175-C.

Continuing further with FIG. 5, in both MAC RX cell ring 300-A and MAC TX cell ring 300-B, the cells are maintained as a permanent ordered ring. In MAC RX cell ring 300-A, cells are always processed in precise sequential ring order. This means that cells are filled by the MAC RX DMA 135-B, processed by the firmware resident in CPU memory 170 (shown in FIG. 2), and transmitted by the CBus TX DMA 120-B, in ring order, as will be explained in greater detail hereinbelow in reference to FIG. 6. Cells that are filtered, so that transmission is unnecessary, still pass through CBus TX DMA 120-B, but are not forwarded to any other modules. In MAC TX cell ring 300-B, cells are similarly processed in sequential ring order, except that cells must be reassembled into packets for transmission to the 100Base-T medium 155. This means that the MAC TX DMA 135-A may process cells out of ring order. Cells, however, cannot be mixed between MAC RX cell ring 300-A and MAC TX cell ring 300-B.

By processing the cells in ring order, no cell is allowed to be placed in a waiting queue for any arbitrary period of time. All cells in both the MAC RX cell ring 300-A and MAC TX cell ring 300-B must be processed in a timely manner.

MAC RX Cell Ring 400 Operation

Figure 6:
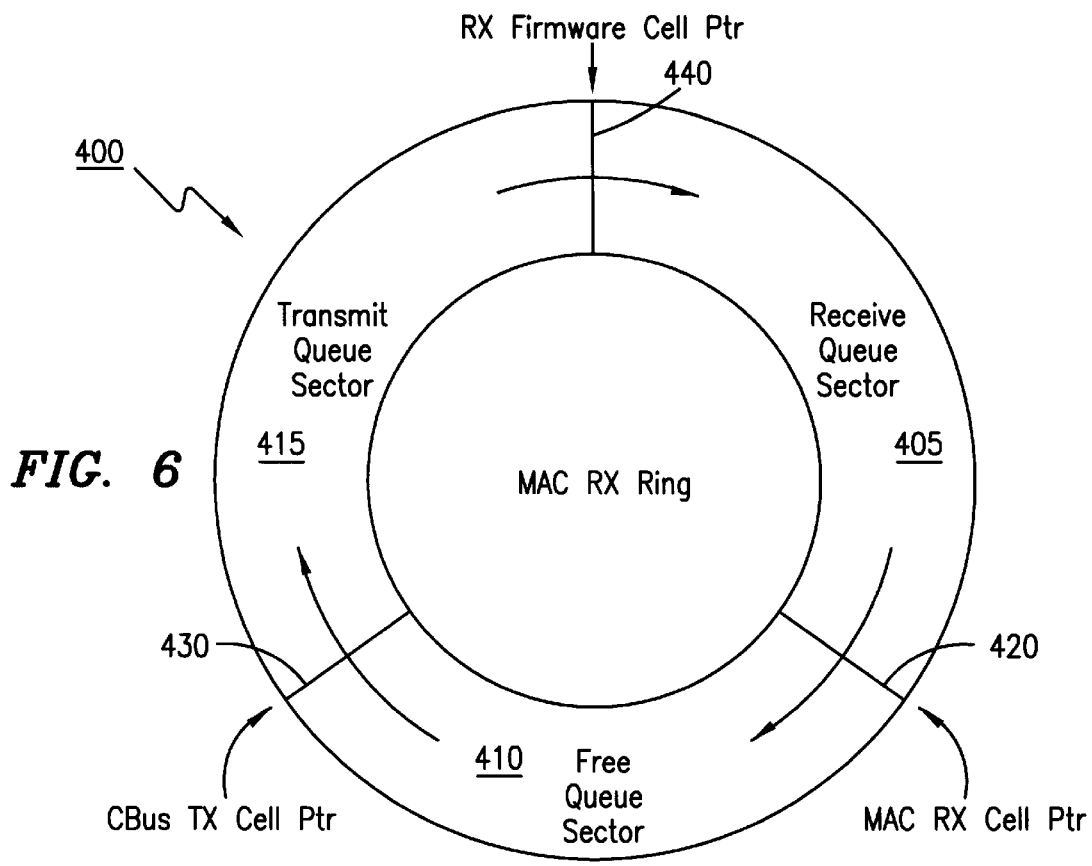
FIG. 6 is graphic representation of a circular receive ring queue having three pointers.

Referring now to FIG. 6, therein is depicted a pictorial representation of the MAC RX cell ring 300-A (shown in FIG. 5) as a three-pointer ring queue, generally denoted by reference numeral 400. Reference numeral 420 refers to the MAC RX cell pointer which points to the head of the receive queue 405. The receive queue 405 comprises cell buffer locations where incoming packets are fragmented and copied into free cell buffers by the MAC RX DMA 135-B (shown in FIG. 5). Reference numeral 430 refers to the CBus TX cell pointer 430 which points to the head of the free queue 410 which comprises cell buffer locations where cells are conditionally transmitted to the forwarding modules and then freed to be ready for reception. Reference numeral 440 refers to the RX Firmware cell pointer which points to the head of the transmit queue 415 which comprises filled cell buffer locations where the firmware makes filter/forward decisions on received cells. In an exemplary embodiment, all three pointers, 420, 430 and 440, are implemented in hardware, but the hardware implementation of the RX Firmware cell pointer 440 is simply maintained as a copy of the same pointer 440 maintained by the firmware.

Referring now together to FIGS. 5 and 6, cell flow through the MAC RX cell ring 300-A can be explained in greater detail. It can be readily understood that as cells are processed within the MAC RX cell ring 300-A, they have three states, corresponding to progressive membership in each of the queues, 405, 410, and 415, of the three-pointer ring queue 400. Each cell is progressively free (in the free queue sector 410 of the ring queue 400), receive completed (in the receive queue sector 405), and processed (in the transmit queue sector 415).

Still referring to FIGS. 5 and 6, the presentation of the detailed operation relative to the MAC RX cell ring 300-A, is further sub-divided as provided immediately hereinbelow.

The MAC RX DMA 135-B Operation:

The MAC RX DMA 135-B is shown in FIG. 5, wherein it is adapted to receive MAC packets from MAC 145 into one or more cell buffers. The hardware associated with the MAC RX DMA 135-B maintains the MAC RX cell pointer 420 to the current MAC RX cell which may be conceptually thought of as moving through the free queue sector 410 of the MAC RX ring queue 400, shifting cells from free queue sector 410 to receive queue 405. Simultaneously, the firmware and the CBus TX DMA hardware combine to move cells from receive queue 405 to free queue 410.

As described hereinabove, there are logically two memory pointer registers within the MAC RX DMA 135-B. The cell pointer register always logically points to the header word 601 (shown in FIG. 3) of the current free cell that is ready to be filled with a packet fragment from MAC 145. The offset point register points to the relative location of a word within the cell, and is incremented as the words (each word being 32 bits) of the cell are received.

Initially, the cell pointer register is set to point to the first logical cell in the ring queue 400. This initializing condition is established by the hardware reset mechanism, including the power up reset, and the control register reset used by the firmware. When the reset is released, the MAC RX DMA 135-B is allowed to begin running.

As will be described hereinbelow in reference to FIG. 8, hardware comparators continuously compare the MAC RX cell pointer 420 with the CBus TX cell pointer 430. The MAC RX DMA 135-B is enabled to operate whenever the MAC RX cell pointer 420 has not caught up with the CBus TX cell pointer 430. This mechanism prevents the MAC RX DMA 135-B from overwriting cells queued for transmission by the CBus TX DMA 120-B.

Before the actual reception can begin, the offset pointer register is initialized to point to the first data word in the cell. At about the same time, the flags and cell length counter registers are initialized appropriately to receive a new cell. The MAC RX DMA 135-B remains idle until it receives the hardware notification that a packet reception has started. When that notification is received, packet data is copied into the cell, advancing the offset pointer register as each bit word is copied from MAC 145 to the cell buffer.

Reception into a cell terminates when any of the following three events occur: (a) the end of the packet is reported by MAC 145; (b) the end of the cell is reached, as detected by the cell length counter; and (c) any reception error as reported by MAC 145. In any of these cases, reception into the current cell terminates.

Following the completion of the cell, the state machine moves forward to the next cell, incrementing the cell pointer register to point to the next cell. At the same time the completion flag bit visible to the firmware is updated so that the firmware is notified that at least one completed cell is ready to be processed for filtering or forwarding.

The MAC RX cell ring 300-A Firmware Operation:

The firmware periodically checks for the presence of the received cells on the MAC RX receive queue 405 by testing the completion flag bit. The firmware processes these cells to determine their disposition by setting the cell header to designate the intended delivery destination and the degree of priority.

The firmware moves forward by updating the cell header using a snooped address that causes the RX firmware cell pointer register within the DMA systems 135-A and 120-B to be updated to the cell address. This causes the CBus TX DMA 120-B to understand that the cell is ready for processing.

The hardware detects congestion by keeping track of the difference between the MAC RX cell pointer 420 and the CBus TX cell pointer 430. Cells must be discarded in a way such that entire packets rather than fragments are discarded. Further, as will be seen later in reference to FIG. 8, the policy must be such as to avoid discarding certain types of packets, for example, Spanning Tree packets.

The CBus TX DMA 120-B Operation:

The CBus TX DMA 120-B is shown in FIG. 5 wherein it is adapted to transmit cells to other modules over the CBus 25. The hardware associated with the CBus TX DMA 120-B maintains the CBus TX cell pointer 430 to the current CBus TX cell which may be conceptually thought of as moving through the transmit queue sector 415, shifting cells from the transmit queue sector 415 to the free queue section 410 of the cell ring queue 400. Simultaneously, the firmware and the MAC RX DMA 135-B hardware combine to move cells from the free queue sector 410 to the transmit queue 415.

As with the MAC RX DMA operation, there is a cell pointer register that points to the header word of the current transmit cell.

Following cell reception from the MAC device 145, the firmware determines whether a cell is to be forwarded to another module. As described hereinabove, when the cell is processed, the destination bitmap 710 (shown in FIG. 4) is written into the cell header, using a snooped address to update the MAC RX firmware cell pointer 440, which in turn alerts the CBus TX DMA 120-B.

Similar to the foregoing discussion regarding the MAC RX DMA 135-B operation, the CBus TX DMA 120-B copies the cell, word by word, into the CBus TX FIFO 115 (FIG. 2). When the complete cell has been transferred to the FIFO, the CBus TX DMA 120-B asserts a cell bus arbitration request. When arbitration is granted, the CBus TX DMA 120-B transfers the data from the CBus TX FIFO 115 to the addressed CBus RX FIFOs of the destination modules, according to the destination bitmap 710. Once a cell is completed, the operation continues for the next cell as described hereinabove.

If one or more of the destination CBus RX FIFOs are congested and not available to receive the data cell, the transmission is retried until transmission to all of the destinations is successful, or until, a predetermined time has passed, that is, a time-out counter is reached. If the cell reaches time-out, then all succeeding cells of the packet will be dropped to that destination according the preferred embodiment of the present invention which will be further detailed hereinbelow.

MAC TX Ring 500 Operation

Figure 7:
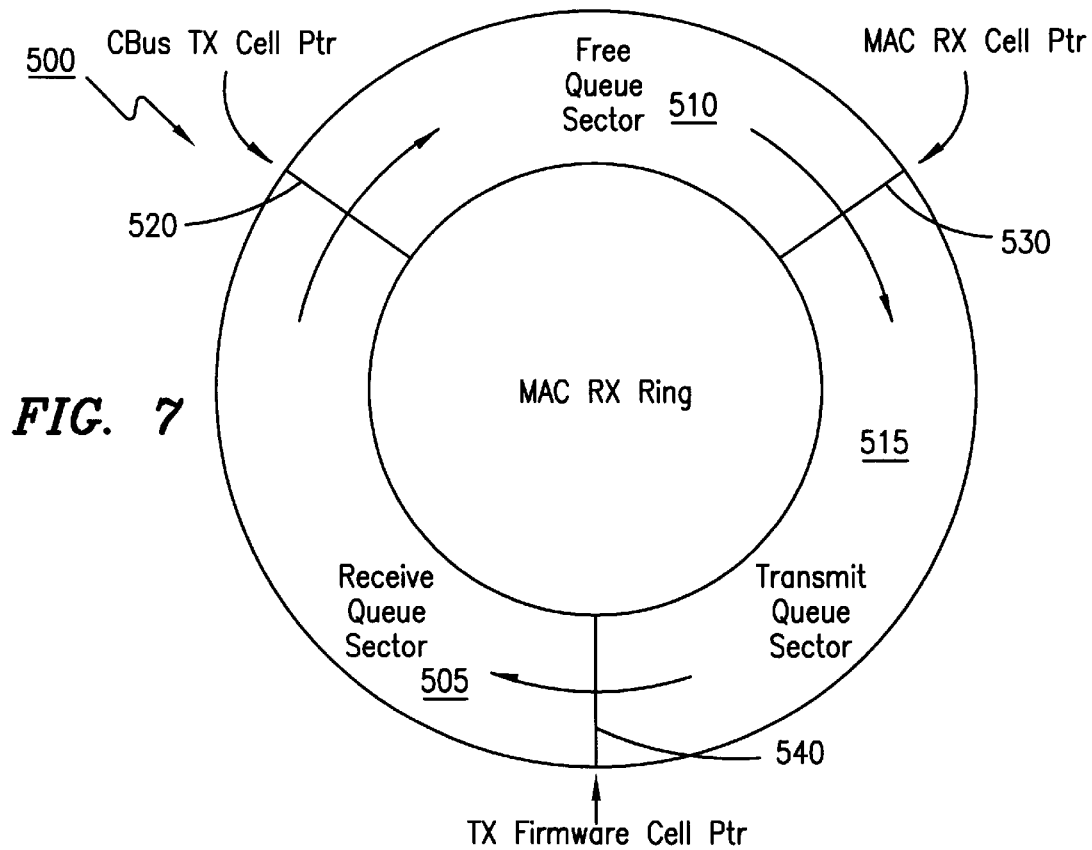
FIG. 7 is a graphic representation of a circular transmit ring queue having three pointers.

Referring now to FIGS. 5 & 7, therein is shown the MAC TX ring queue, generally at 500, having a three-pointer circular memory location map. Reference numeral 520 refers to the CBus RX cell pointer pointing to the head of the receive queue sector 505 where incoming cells from a sending SBLK are copied into free cell buffers by the CBus RX DMA 120-A. Reference numeral 530 refers to the MAC TX cell pointer pointing to the head of the free queue sector 510 where sorted cells are conditionally transmitted to the MAC device 145 and then freed. Reference numeral 540 refers to the TX Firmware cell pointer pointing to the head of transmit queue sector 515 where the firmware sorts received cells into packets.

The general operation of the MAC TX cell ring 300-B may now be explained by considering FIGS. 5 and 7 together. Since it operates in a similar fashion as the MAC RX cell ring 300-A above, but in a reverse order, only an overview will be presented immediately hereinbelow.

When data cells arrive at the destination module, they are copied into the CBus RX FIFO 110 (FIG. 2). As each 32 bit word is copied into the CBus RX FIFO 110, CBus RX DMA 120-A starts to copy the cell words from the Cbus RX FIFO into data buffer 125. Cells are then processed by the firmware so that they are enqueued into reassembly queues, for example, 330-A and 330-B, shown in FIG. 5. When a proper packet data is assembled, it is enqueued for transmission in the MAC TX DMA 135-A, from which it is sent to the MAC device 145 for further downstream medium transmission.

Congestion Indicator

Figure 8:
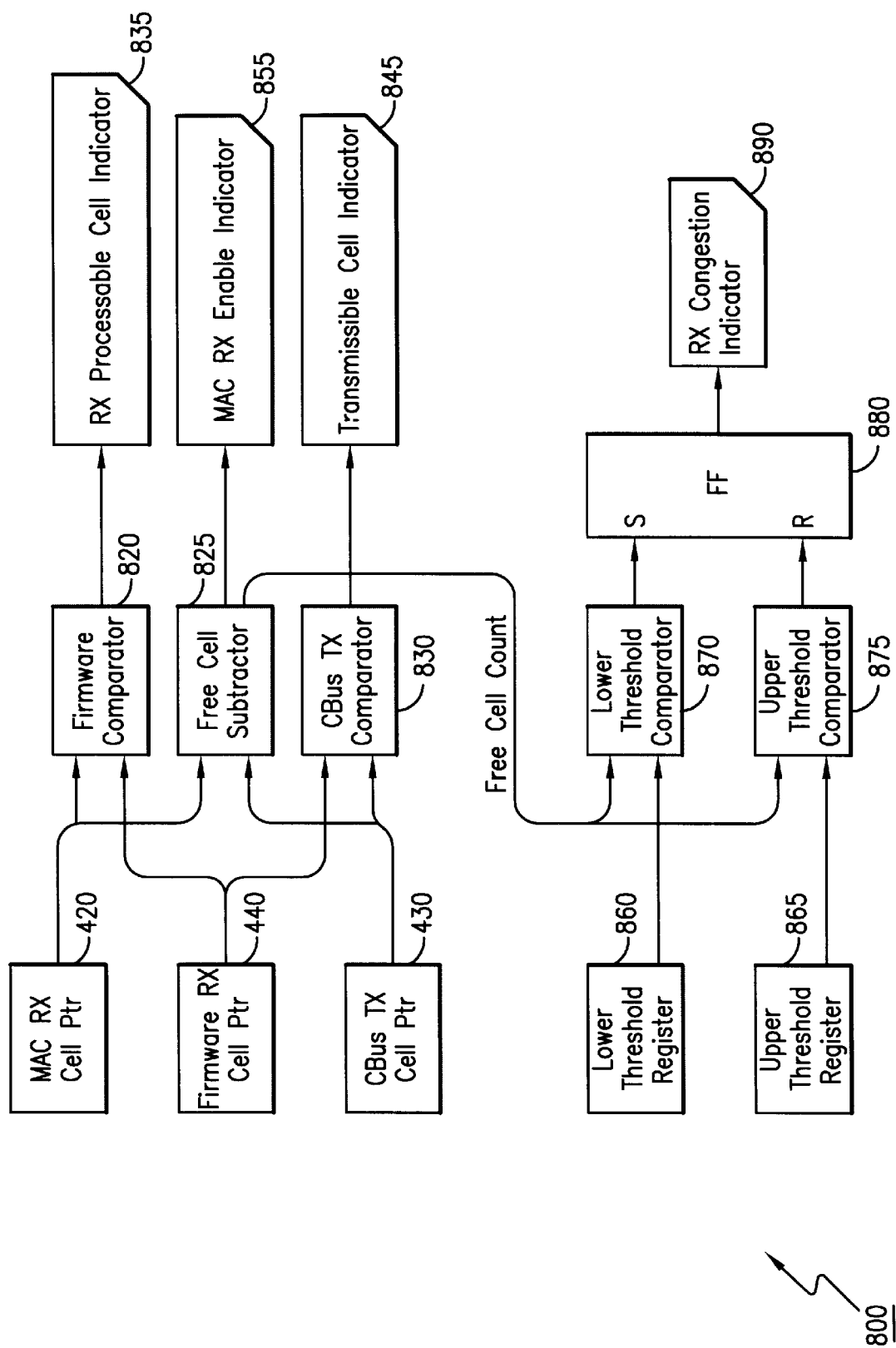
FIG. 8 is a functional block diagram of an exemplary embodiment of the receive ring congestion detecting system in accordance with the present invention.

Referring now to FIG. 8, therein is shown a functional block diagram of an exemplary embodiment of the present invention for flow control and congestion management support relating to the MAC RX cell ring 300-A. As can be readily appreciated by those skilled in the art, flow control in this context is contemplated to be the management of the three pointers, 420, 430 and 440, of the ring queue 400 (shown in FIG. 6), so that none of the three overtake another pointer with resulting cell or packet corruption.

Continuing further with FIG. 8, a firmware comparator 820 compares the MAC RX cell pointer 420 and the MAC Firmware RX cell pointer 440 to produce the RX processable cell indicator 835. Reference numeral 825 refers to a free cell subtractor which operates on the MAC RX cell pointer 420 and the CBus TX cell pointer 430 to produce the MAC RX Enable indicator 855. The CBus TX comparator 830 compares the MAC Firmware RX cell pointer 440 and the CBus TX cell pointer 430 to produce the Transmissible cell indicator 845. The number of free cells is computed from the circular cell pointer difference as computed by the free cell subtractor 825 and is compared against a lower threshold register 860 by a lower threshold comparator 870 and against an upper threshold register 865 by an upper threshold comparator 875, to provide a RX congestion indicator 890. This is done so that undesirable oscillations in the RX congestion indicator 890 are bounded by hysteresis to a lower boundary and an upper boundary as indicated in boundary selector 880. The RX congestion indicator 890 is used only within a port module (either any SBLK or MBLK), and is not made available to other modules. Although good results have been achieved utilizing the above procedure respecting hysteresis, it is contemplated that the present invention can be practiced by one skilled in the art without providing such hysteresis.

Figure 9:
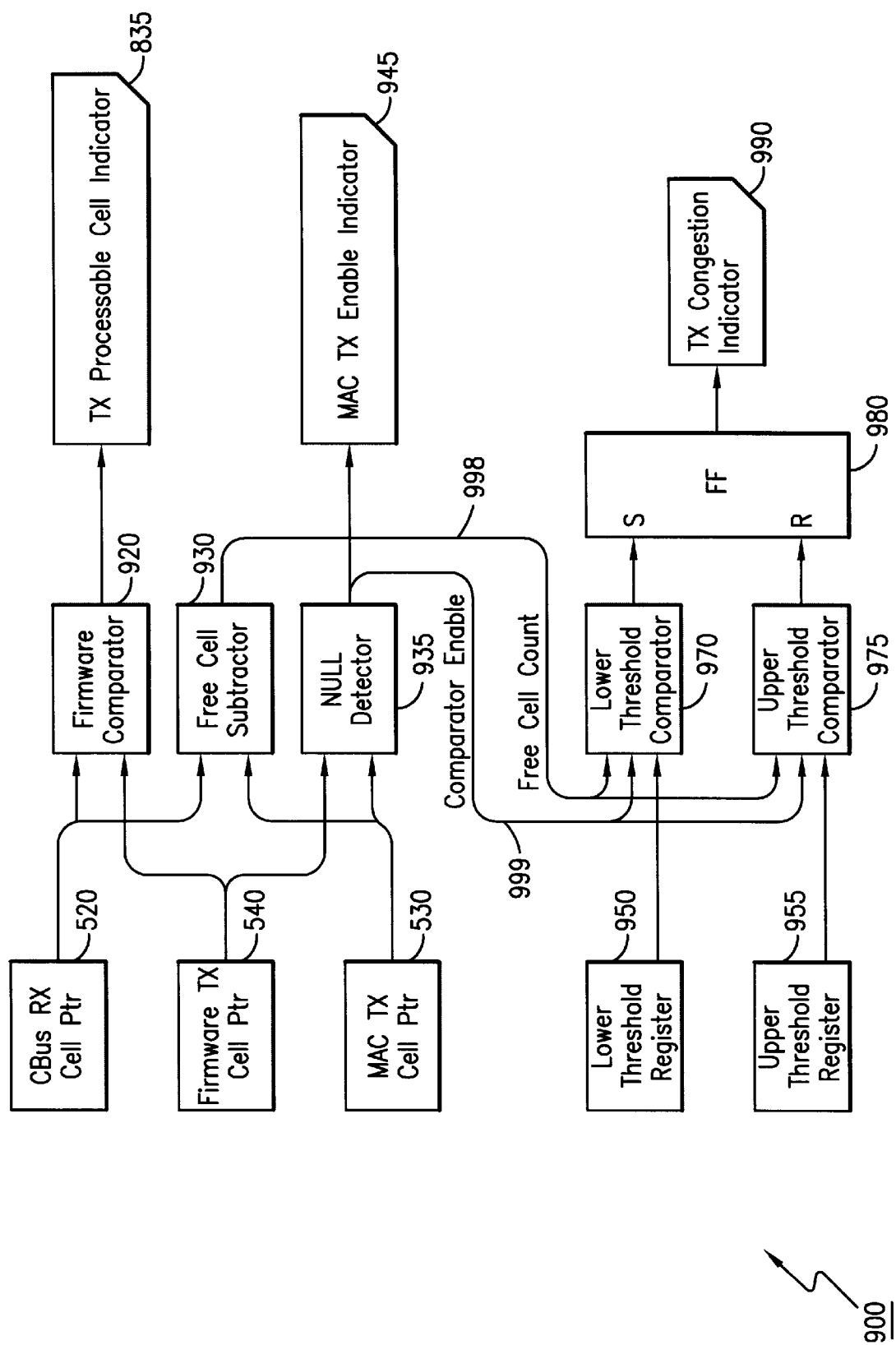
FIG. 9 is a functional block diagram of an exemplary embodiment of the transmit ring congestion detecting system in accordance with the present invention.

Referring now to FIG. 9, therein is shown a functional block diagram of an exemplary embodiment of the present invention for flow control and congestion management support relating to the MAC TX cell ring 300-B. As can be readily appreciated by those skilled in the art, flow control in this context is contemplated to be the management of the three pointers, 520, 530 and 540, of the TX ring queue 500 (shown in FIG. 7), so that none of the three overtake another pointer with resulting cell or packet corruption.

Continuing with FIG. 9, a firmware comparator 920 compares the CBus RX cell pointer 520 and the Firmware TX cell pointer 540 to produce a TX processable cell indicator 940. A NULL detector 935 operates on the MAC TX cell pointer 530 to produce a MAC TX Enable indicator 945. The output from the NULL detector 935 is also used in producing a TX congestion indicator 990 as will be detailed hereinbelow.

Still continuing with FIG. 9, it is seen that a free cell subtractor 930 is used for computing the number of free cells by operating on the CBus RX cell pointer 520 and the MAC TX cell pointer 530. Since the CBus RX DMA 120-A (FIG. 5) is always free to run, there is no direct flow control indicator, although the free cell count is utilized in producing the TX congestion indicator 990. The true output from the NULL detector will produce a comparator enable signal 999. A lower threshold comparator 970 operates on the comparator enable signal 999, the free cell count 998, in conjunction with a lower threshold register 950 to produce a lower boundary for the TX congestion indicator 990. Further, an upper threshold comparator 975 operates on the comparator enable signal 999, the free cell count 998, in conjunction with an upper threshold register 955 to produce an upper boundary for the TX congestion indicator 990, as selected by a boundary selector 980. According to the teachings of the present invention, the TX congestion indicator 990 is made available to the sending modules, both SBLKs and the MBLK.

By referring to FIGS. 8 and 9 together, it is now possible to describe a presently preferred congestion management policy in accordance with the present invention. The principal goals of the presently preferred congestion management policy are: (a) push the cells across the CBus 25 as fast as possible and do most of the cell buffering in the sending module; (b) do cell buffering in the receiving module only when the sending module is congested; and (c) do not drop packets unless the sending module is excessively congested.

As each cell is considered for transmission by the sending module, a decision within the CBus TX DMA 120-B (FIG. 5) is made as to the disposition of the cell. In a presently preferred embodiment, the following options may be implemented: (a) transmit the cell; (b) hold the cell, subject to time-out in order to minimize "head of queue" blocking; (c) drop the cell immediately, and continue around the ring. It is preferable not to drop priority packets, therefore two or more separate time-out registers are used to configure the time-outs for normal and priority cells, respectively.

In accordance with the presently preferred embodiment of the present invention, congestion management and flow control are merged into a single mechanism. It is possible for multiple receiving ports to attempt to drive traffic through a single sending port at rates that exceed its capability. When this happens transiently, cells are buffered in memory which provides the elasticity to survive such transients without packet loss. Further, buffering memory is preferably distributed between the receiving port and the sending port. The architecture according to the presently preferred embodiment of the present invention is adapted to buffer in the sending port preferentially, thereby avoiding or help minimizing "head of queue" delays. It can be appreciated that even with extensive memory buffering, there can be a burst of sufficient magnitude and duration that the memory capacity may be exhausted. Moreover, even with short overdrive transients, the internal bandwidth capability of an SBLK is less than that of the CBus, since there may be other required internal activities. It is therefore possible to overstress the elastic capability of the CBus RX FIFO. In addition, the internal mechanisms that process cells within the logical rings, the MAC RX cell ring 300-A and the MAC TX cell ring 300-B, of the module must cooperate with each other and with the congestion management so that each of three processes, described in detail hereinabove in reference to FIGS. 5, 6 and 7, does not overrun the next one. In particular, it can be readily appreciated that congestion management is the only mechanism that prevents the CBus RX DMA 120-A from overwriting valid untransmitted cells ready to be packetized in the MAC TX cell ring 300-B.

The presently preferred embodiment of the present invention employs strategies that advantageously mix CBus slow-down with packet discarding to address these aforementioned problems. The tactical approach is to use moderate CBus throttling to overcome the FIFO limitation, and then use congestion detection in both the origination port module ("sender") and the destination port module ("receiver") to determine when it is absolutely necessary to initiate the packet discard strategy. The presently preferred embodiment of the present invention is further adapted so that only rarely any one of the hardware mechanisms, disclosed and described in great detail hereinabove, is allowed to hit its absolute maximum performance limit. Further, a two-tier priority mechanism is preferably used so that cells associated with internal switch management, such as messages to and from the MBLK 35 (FIG. 1), as well as cells belonging to the Spanning Tree Protocol can be protected from being dropped by the presently preferred embodiment of the congestion management scheme.

Figure 10:
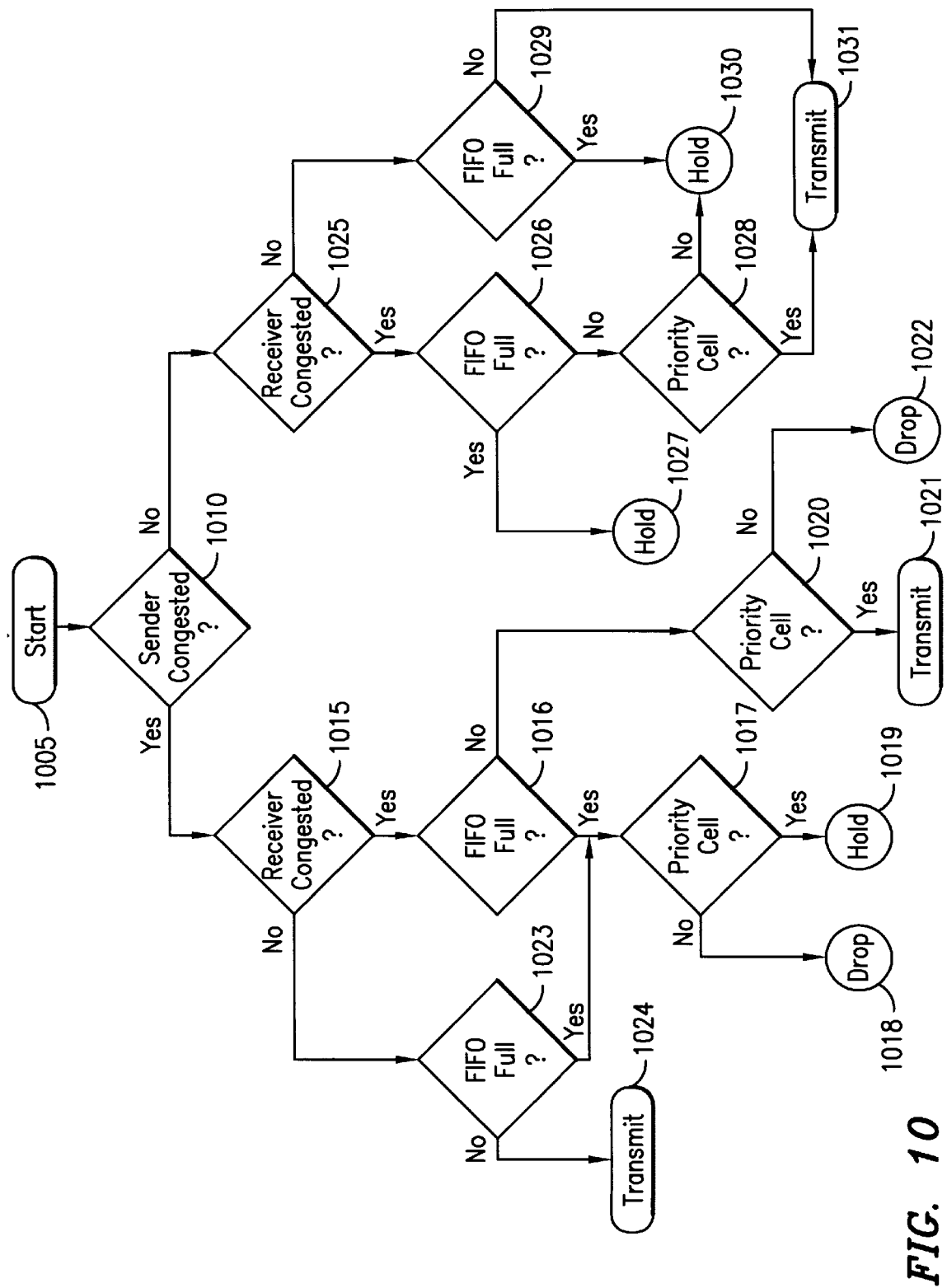
FIG. 10 is an exemplary decision tree illustrating a congestion management scheme in accordance with the present invention.

Referring now to FIG. 10, therein is shown an exemplary flowchart illustrating the congestion management actions to be taken based on the three congestion indicators, namely the RX congestion indicator, the TX congestion indicator, and the CBus RX FIFO full indicator, available for decision making according to the presently preferred embodiment of the present invention.

Entering the decision tree at 1005, the sender congestion is determined by testing the RX congestion indicator as shown in the decision block 1010. By taking the YES path therefrom, a decision block 1015 is entered wherein the receiver congestion is determined by testing the TX congestion indicator associated therewith. By taking the YES path from the decision block 1015, the FIFO full condition is tested in a decision block 1016. Via the YES path from the decision block 1016, the two-tiered priority scheme is implemented as shown in the decision block 1017. If the cell is a priority cell, then it is held in the buffering memory, subject to a time-out mechanism. On the other hand, if it is not a priority cell, then it is dropped as indicated at 1018.

By taking the NO path from the decision block 1016 and executing the two-tiered priority scheme as indicated in the decision block 1020, a cell is transmitted if it is a priority cell, as shown at 1021. Otherwise, it is dropped as indicated at 1022.

The NO path from the TX congestion decision block 1015 in conjunction with the FIFO full determination at 1023 will give rise to the following actions. If the FIFO is not full, then transmit the cell. Otherwise, test for the priority flag at 1017, and, as described before, drop the cell if it is not, and hold with time-out if it is.

Continuing with FIG. 10, by taking the NO path from the RX congestion decision block 1010, another set of strategies are implemented according to the presently preferred embodiment of the present invention. By taking the YES path from the TX congestion decision block 1025, the FIFO full indicator is tested as shown in the decision block 1026. If the FIFO is full, then the cell is held in the buffer, subject to time-out, as indicated at 1027. Otherwise, the priority of the cell is determined as shown in the decision block 1028. If priority is tested YES, then the cell is transmitted, as indicated at 1031. Otherwise, the cell is held in the buffer, subject to time-out, as indicated at 1030.

By taking the NO path from the TX congestion decision block 1025, the FIFO full indicator is tested again as shown in the decision block 1029. If the FIFO is full, then the cell is held in the buffer, subject to time-out, as indicated at 1030. Otherwise, the cell is transmitted, as shown in 1031.

Figure 11:
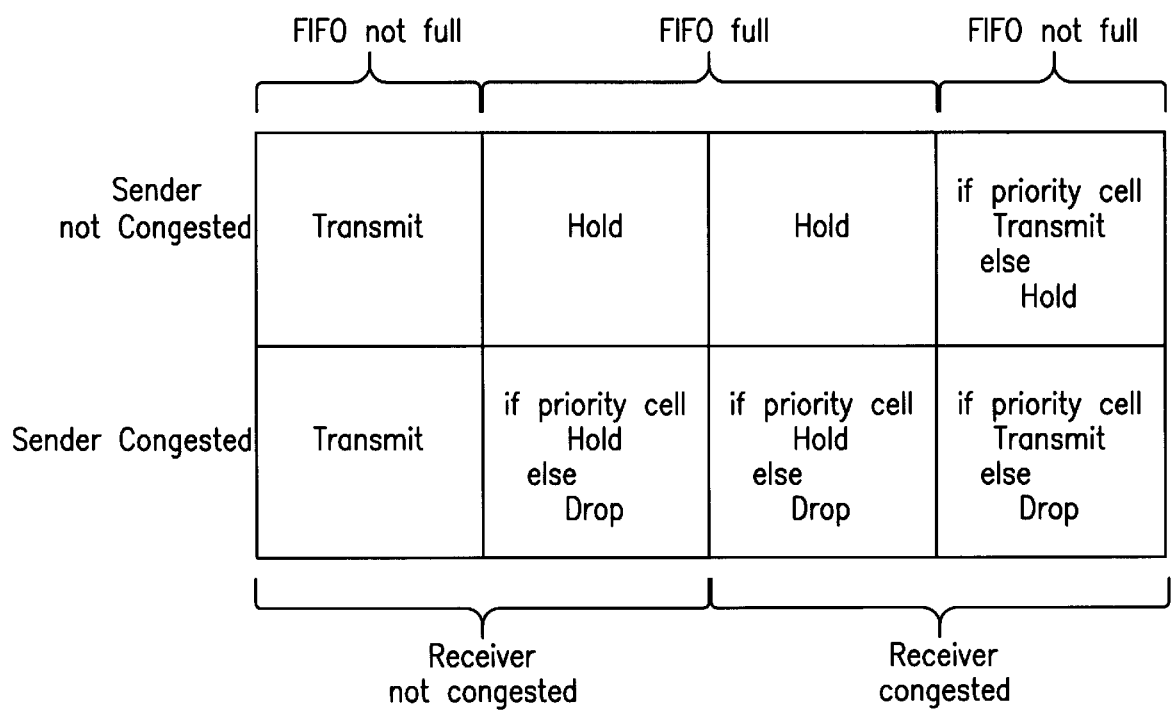
FIG. 11 is a Karnaugh map illustrating a congestion management scheme in accordance with the present invention.

It can be readily appreciated by those skilled in the art upon reference hereto that a congestion management scheme as disclosed hereinabove can also be also presented in a Karnaugh map such as depicted in FIG. 11.

It can further be appreciated that congestion management in MBLK 35 is similar to that of the SBLK modules, described hereinabove. According to the presently preferred exemplary embodiment of the present invention, it is required that it be compatible. Further, such compatibility requires that the MBLK RX cell ring make a congestion indicator flag available to the SBLK modules. The principal difference is that as there is no MAC DMA associated with the MBLK, the MBLK RX cell ring uses the remaining two pointers, namely, a Firmware cell pointer and a CBus RX cell pointer, to accurately determine the cell count difference. The resulting congestion indicator is used in the same way as in the SBLK module congestion management scheme described hereinabove.

Although presently preferred exemplary embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims. For example, it will be readily appreciated upon reference hereto that although ring buffers have been disclosed herein, other non-sequential buffer mechanisms can be used, such as allocated buffers.

It will also be readily appreciated upon reference hereto that the congestion management scheme of the present invention can be used in a different switching apparatus operably disposed in any communication system having inter-connected networks such as a fiber distributed data interface ("FDDI") system or an asynchronous transfer mode ("ATM") system. The processor and the centralized DMA engine may be implemented on virtually any known hardware platform. The mechanisms for determining any of the flow control and congestion indicators, for example, the TX congestion indicator, the RX congestion indicator and the FIFO full indicator, may further be implemented either in pure hardware structures, or in pure software structures, or in some firmware structures. Accordingly, it is contemplated herein that a "structure" can encompass any of these configurations.

It is further contemplated that the present invention can be practiced by one skilled in the art by utilizing a congestion detection method other than that disclosed herein, such as the detection of when the supply of empty cells falls below a selected threshold, indicating congestion.

In addition, the hysteresis boundary for the RX congestion indicator may conceivably be different from that for the TX congestion indicator, based on different traffic conditions. Moreover, it will be known that the boundaries may be dynamically allocable, again depending upon instantaneous cell traffic. Also, it is possible to implement some sort of learning capability coupled with the dynamic allocation of the lower and upper thresholds, after gathering statistics and suitably modeling cell traffic congestion behavior.

Further, it is contemplated that multiple levels of priority cells can also be utilized in the present invention.

What is claimed is:

1. A system for managing congestion within a data communication system, said data communication system including a sender and a receiver between which traffic may be transmitted, said system for managing congestion comprising:

(a) a structure for determining whether said sender is congested;

(b) a structure for determining whether said receiver is congested; and (c) a structure for handling said traffic based upon whether said sender is congested and whether said receiver is congested, wherein said structure for handling handles said traffic as follows:

(i) if said sender is congested and said receiver is not congested, then transmitting said traffic;

(ii) if said sender is not congested and said receiver is not congested, then transmitting said traffic;

(iii) if said sender is not congested and said receiver is congested, then holding said traffic; and (iv) if said sender is congested and if said receiver is congested, then dropping said traffic.

2. The system as recited in claim 1, and further comprising:

(a) a first-in first-out (FIFO) structure;

(b) a structure for determining whether said FIFO structure is congested; and wherein said structure for handling said traffic transmits said traffic if said sender is congested and said receiver is not congested and said FIFO structure is not congested.

3. The system as recited in claim 2, wherein said traffic may be priority traffic, and further wherein if said sender is congested, said receiver is not congested and said FIFO structure is congested:

(a) said structure for handling traffic holds said traffic if said traffic is priority traffic; and otherwise (b) said structure for handling said traffic discards said traffic.

4. The system as recited in claim 3, wherein if said sender is congested, said receiver is congested and said FIFO structure is congested:

(a) said structure for handling traffic holds said traffic if said traffic is priority traffic; and otherwise (b) said structure for handling said traffic discards said traffic.

5. The system as recited in claim 4, wherein if said sender is congested, said receiver is congested and said FIFO structure is not congested:

(a) said structure for handling traffic transmits said traffic if said traffic is priority traffic; and otherwise (b) said structure for handling said traffic discards said traffic.

6. The system as recited in claim 5, wherein said structure for handling traffic transmits said traffic if said sender is not congested, said receiver is not congested and said FIFO structure is not congested.

7. The system as recited in claim 6, wherein said structure for handling traffic holds said traffic if said sender is not congested, said receiver is not congested and said FIFO structure is congested.

8. The system as recited in claim 7, wherein said structure for handling traffic holds said traffic if said sender is not congested, said receiver is congested and said FIFO structure is congested.

9. The system as recited in claim 8, wherein if said sender is not congested, said receiver is congested and said FIFO structure is not congested:
   (a) said structure for handling traffic transmits said traffic if said traffic is priority traffic; and otherwise
   (b) said structure for handling said traffic holds said traffic.

10. The system as recited in claim 1, wherein said traffic comprises at least one cell, said at least one cell for holding data information and management information, and said system further comprising a bus, said bus for transporting said traffic.

11. The system as recited in claim 1, wherein said sender further comprises at least one ring data structure, said at least one ring data structure for facilitating out-going transmission of said traffic.

12. The system as recited in claim 1, wherein said receiver further comprises at least one ring data structure, said at least one ring data structure for facilitating in-coming reception of said traffic.

13. The system as recited in claim 1, wherein said sender is operably connected to a communication medium.

14. The system as recited in claim 13, wherein said receiver is operably connected to said communication medium.

15. The system as recited in claim 14, wherein said communication medium comprises an Ethernet medium.

16. The system as recited in claim 14, wherein said communication medium comprises a fiber distributed data interface medium.

17. The system as recited in claim 1, wherein said structure for determining whether said sender is congested comprises a sender-congestion-indicator.

18. The system as recited in claim 1, wherein said structure for determining whether said receiver is congested comprises a receiver-congestion-indicator.

19. The system as recited in claim 2, wherein said structure for determining whether said FIFO structure is congested comprises a FIFO-congestion-indicator.

20. The system as recited in claim 1, and further comprising:
   (a) a first-in first-out (FIFO) structure; and
   (b) a structure for determining whether said FIFO structure is congested, wherein if said sender is congested, said receiver is not congested and said FIFO structure is congested, said structure for handling traffic holds said traffic if said traffic is priority traffic, and otherwise said structure for handling said traffic discards said traffic.

21. The system as recited in claim 1, and further comprising:
   (a) a first-in first-out (FIFO) structure;
   (b) a structure for determining whether said FIFO structure is congested, wherein if said sender is congested, said receiver is congested and said FIFO structure is congested, said structure for handling traffic holds said traffic if said traffic is priority traffic, and otherwise said structure for handling said traffic discards said traffic.

22. A method for managing congestion within a data communication system, said data communication system including a sender and a receiver between which traffic may be transmitted, said method for managing congestion comprising the steps of:
   (a) determining whether said sender is congested;
   (b) determining whether said receiver is congested; and
   (c) handling said traffic based upon whether said sender is congested and whether said receiver is congested, wherein:
      (i) if said sender is congested and said receiver is not congested, then transmitting said traffic;
      (ii) if said sender is not congested and said receiver is not congested, then transmitting said traffic;
      (iii) if said sender is not congested and said receiver is congested, then holding said traffic; and
      (iv) if said sender is congested and if said receiver is congested, then dropping said traffic.

* * * * *